(12) United States Patent
Kitao

(10) Patent No.: US 7,623,143 B2
(45) Date of Patent: Nov. 24, 2009

(54) LIGHT QUANTITY ADJUSTING APPARATUS, COLOR-REGISTRATION-DEVIATION AMOUNT DETECTING APPARATUS LIGHT QUANTITY ADJUSTING METHOD, AND COLOR-REGISTRATION-DEVIATION AMOUNT DETECTING METHOD

(75) Inventor: Katsuyuki Kitao, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 841 days.

(21) Appl. No.: 11/320,410

(22) Filed: Dec. 29, 2005

(65) Prior Publication Data

US 2006/0164506 A1 Jul. 27, 2006

(30) Foreign Application Priority Data

Jan. 7, 2005 (JP) .............................. 2005-002533

(51) Int. Cl.
*G03G 15/01* (2006.01)
(52) U.S. Cl. ....................................... 347/116; 399/301
(58) Field of Classification Search ................. 347/116; 399/301, 46, 49
See application file for complete search history.

(56) References Cited

U.S. PATENT DOCUMENTS 7,251,423 B2 * 7/2007 Shimura et al. ................ 399/49
7,260,336 B2 * 8/2007 Shimura et al. ................ 399/49
7,360,886 B2 * 4/2008 Kitao .......................... 347/103

FOREIGN PATENT DOCUMENTS

| | | |
|---|---|---|
| JP | 1-157668 | 6/1989 |
| JP | 6-113089 | 4/1994 |
| JP | 7-245682 | 9/1995 |
| JP | 9-27909 | 1/1997 |
| JP | 9-172525 | 6/1997 |
| JP | 9-200449 | 7/1997 |
| JP | 9-298628 | 11/1997 |
| JP | 10-108020 | 4/1998 |
| JP | 2946520 | 7/1999 |
| JP | 2000-19656 | 1/2000 |
| JP | 2001-86341 | 3/2001 |
| JP | 2001-318501 | 11/2001 |
| JP | 2003-98795 | 4/2003 |
| JP | 2003-228216 | 8/2003 |
| JP | 2003-280317 | 10/2003 |

* cited by examiner

*Primary Examiner*—Huan H Tran
(74) *Attorney, Agent, or Firm*—Oblon, Spivak, McClelland, Maier & Neustadt, L.L.P.

(57) ABSTRACT

Light quantity is adjusted in an image forming apparatus including an image carrier by forming a pattern on the image carrier, detecting a light quantity of a reflecting light from the pattern and outputting a voltage, reading the light quantity of the reflecting light from the pattern detected once based on a present light quantity set, calculating from the light quantity read, a set light quantity corresponding to a target output voltage for printing, and setting the set light quantity calculated.

28 Claims, 7 Drawing Sheets

LIGHT QUANTITY ADJUSTING APPARATUS, COLOR-REGISTRATION-DEVIATION AMOUNT DETECTING APPARATUS LIGHT QUANTITY ADJUSTING METHOD, AND COLOR-REGISTRATION-DEVIATION AMOUNT DETECTING METHOD

CROSS-REFERENCE TO RELATED APPLICATIONS

The present document incorporates by reference the entire contents of Japanese priority document, 2005-002533 filed in Japan on Jan. 7, 2005.

BACKGROUND OF THE INVENTION

1. Field of the Invention

The present invention relates to a light quantity adjusting apparatus, a color-registration-deviation amount detecting apparatus, a light quantity adjusting method, and a color-registration-deviation amount detecting method that can make adjustment by simple procedures.

2. Description of the Related Art

In color image forming apparatuses, color registration deviation must be eliminated in output images of respective colors of magenta, cyan, yellow, and black so as to improve image quality. In quadruple tandem color image forming apparatuses that include a pair of a write optical system and an image carrier per color, images of the respective colors are formed by different pairs of optical systems and image carriers. Therefore, color registration deviation is particularly apt to occur. For correcting the color registration deviation, there is generally known a technique of writing a position deviation detection pattern on a transfer belt or the like, reading the pattern by a sensor to detect a deviation amount, and correcting the deviation amount by adjusting the write timing or with an optical system correcting unit.

For example, Japanese Patent Application Laid-Open No. 2001-318501 discloses a technique that is intended to detect a difference in reflectance between a color registration deviation pattern of each color transferred onto a carrier with a very small light quantity and the carrier itself and to correct a color registration deviation without being affected by a surface state and a transfer surface color of the carrier. A reference voltage for reading a plurality of color registration deviation detection pattern images through a regular reflection optical system based on a base reflecting state of a transfer belt detected by an optical sensor, which serves as the regular reflection optical system, is variably set. The reference voltage is compared with a signal output from the optical sensor, so that a controlling unit generates a pulse signal. The color registration deviation amount among the images of the respective colors is calculated based on the generated pulse signal, and image positions are controlled to be corrected by image forming stations for the colors other than the reference color based on the calculated color registration deviation amount.

Japanese Patent Application Laid Open Nos. 2003-228216, 2003-098795, and 2003-280317 also disclose known and related techniques.

However, according to the invention disclosed in Japanese Patent Application Laid Open No. 2001-318501, since it is necessary for a light quantity detector to read the output of each color registration deviation detection pattern without fail, a quantity of emitted light for irradiating the pattern must be adjusted to a desired level before the color registration deviation detection.

That is, according to the conventional technique, to adjust the light quantity, a processing of changing a set value of the light quantity and reading the output of each pattern is repeated a plurality of times before calculating the set value of the light quantity, at which the desired target output can be obtained. Therefore, adjustment of the light quantity takes a long time.

SUMMARY OF THE INVENTION

It is an object of the present invention to at least solve the problems in the conventional technology.

According to an aspect of the present invention, a light quantity adjusting apparatus includes a forming unit that forms a pattern on an image carrier, a detector that detects a light quantity of a reflecting light from the pattern formed by the forming unit and outputs a voltage corresponding to the light quantity detected, a calculating unit that reads the light quantity of the reflecting light from the pattern detected once by the detector based on a present light quantity set for the detector, and calculates from the light quantity read, a set light quantity corresponding to a target output voltage for printing, and a setting unit that sets the set light quantity calculated by the calculating unit.

According to another aspect of the present invention, a color-registration-deviation amount detecting apparatus includes a light quantity adjusting apparatus including a forming unit that forms a pattern on an image carrier, a detector that detects a light quantity of a reflecting light from the pattern formed by the forming unit and outputs a voltage corresponding to the light quantity detected, a calculating unit that reads the light quantity of the reflecting light from the pattern detected once by the detector based on a present light quantity set for the detector, and calculates from the light quantity read, a set light quantity corresponding to a target output voltage employed for printing, and a setting unit that sets the set light quantity calculated by the calculating, and a color-registration-deviation amount detector that detects a color registration deviation amount after the setting unit sets the set light quantity.

According to still another aspect of the present invention, a method of adjusting light quantity in an image forming apparatus including an image carrier includes forming a pattern on the image carrier, detecting a light quantity of a reflecting light from the pattern formed at the forming and outputting a voltage corresponding to the light quantity detected, reading the light quantity of the reflecting light from the pattern detected once at the detecting based on a present light quantity set for the detecting, calculating from the light quantity read, a set light quantity corresponding to a target output voltage for printing, and setting the set light quantity calculated by the calculating unit.

According to still another aspect of the present invention, a method of determining a color registration deviation amount in an image forming apparatus including an image carrier includes forming a pattern on the image carrier, detecting a light quantity of a reflecting light from the pattern formed at the forming and outputting a voltage corresponding to the light quantity detected, reading the light quantity of the reflecting light from the pattern detected once at the detecting based on a present light quantity set for the detecting, calculating from the light quantity read, a set light quantity corresponding to a target output voltage for printing, setting the set light quantity calculated by the calculating unit, and determining a color registration deviation amount after the set light quantity is set at the setting.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

Figure 1:
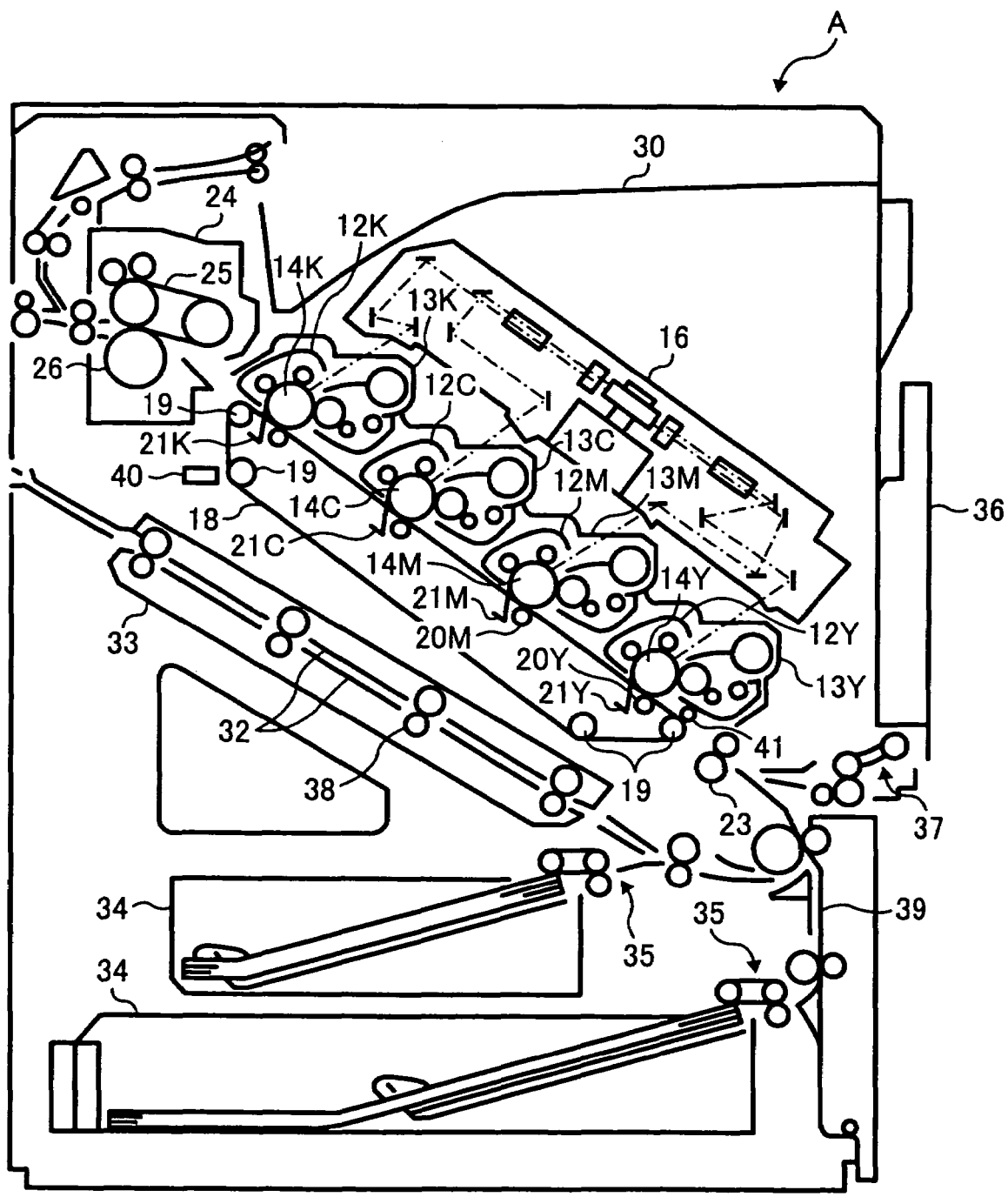
FIG. 1 is a schematic of a color image forming apparatus according to an embodiment of the present invention.

FIG. 1 is a schematic of a color image forming apparatus according to an embodiment of the present invention. This color image forming apparatus includes three paper feed trays, i.e., one manual feed tray 36 and two paper feed cassettes 34 (first and second paper feed trays). Transfer paper fed from the manual feed tray 36 is directly transported to a registration roller 23 by a paper feed roller 37 or transfer paper fed from the first and the second paper feed cassettes 34 is transported to the registration roller 23 by a paper feed roller 35 through an intermediate roller 39. A registration clutch (not shown) is turned on at a timing at which an image formed on each photoconductor substantially coincides with a tip end of the transfer paper, and the transfer paper is then transported to a transfer belt 18. The transfer paper is attracted onto the transfer belt 18 by a bias applied to a paper suction roller 41 when the transfer paper is passed through a paper suction nip, which is constituted by the transfer belt 18 and the paper suction roller 41 abutting on the transfer belt 18. The transfer paper is transported at a predetermined process linear velocity.

A transfer bias having a polarity (a positive polarity) opposite to a (negative) polarity charged on toners is applied to transfer brushes 21K, 21C, 21M, and 21Y arranged to be opposite to photosensitive drums 14K, 14C, 14M, and 14Y of the respective colors across the transfer belt 18, respectively. By doing so, toner images of the respective colors formed on the photosensitive drums 14K, 14C, 14M, and 14Y are transferred onto the transfer paper attracted onto the transfer belt 18 in order of Yellow→Magenta→Cyan→Black.

The transfer paper after this transfer step of transferring the toner images of the respective colors onto the transfer paper is separated from the transfer belt 18 by self stripping performed by a drive roller 19 of a transfer belt unit. The resultant transfer paper is transported to a fixing unit 24, and passes through a fixing nip constituted by a fixing belt 25 and a pressure roller 26 to fix the toner images onto the transfer paper. Thereafter, the transfer paper is discharged to an FD tray 30 if a print mode is a simplex printing mode.

If a duplex printing mode is selected in advance, the transfer paper having passed through the fixing unit 24 is fed to a duplex inversion unit (not shown). The transfer paper is turned upside down by the duplex inversion unit, transported to a duplex transport unit 33 located in a lower portion of the transfer belt, and transported to the registration roller 23 from a transport path 32 by a transport roller 38 through the intermediate roller 39 again. Thereafter, through the same operation as a process operation performed in the simplex printing mode, the transfer paper passes through the fixing unit 24 and is discharged to the FD tray 30.

Operations performed by image forming units of the color image forming apparatus will be explained in detail.

The image forming units include the photosensitive drums 14K, 14C, 14M, and 14Y, imaging units 12K, 12C, 12M, and 12Y each including a charging roller and a cleaning unit, and developing units 13K, 13C, 13M, and 13Y for the respective colors. During image formation, the photosensitive drums 14K, 14C, 14M, and 14Y are driven to rotate by a main motor (not shown), and neutralized by alternate current (AC) biases (without direct current (DC) components) applied to the corresponding charging rollers, respectively. A surface potential of each of the photosensitive drums 14K, 14C, 14M, and 14Y is thus set to a reference potential of, for example, about −50 volts.

The photosensitive drums 14K, 14C, 14M, and 14Y are evenly charged with potentials substantially equal to those of DC components by applying a DC bias, on which an AC bias is superimposed, to each charging roller. The surface potential of each of the photosensitive drums 14K, 14C, 14M, and 14Y is thus set to, for example, about −500 to −700 volts (a target charging potential is determined by a process controller). Digital image information transmitted as an image to be printed from a controller unit is converted into binary laser diode (LD) light emission signals for the respective colors, and irradiated onto the photosensitive drums 14K, 14C, 14M, and 14Y of the respective colors through a cylinder lens, a polygon motor, an fθ lens, first to third mirrors, and a WTL lens (a writing unit 16). The surface potential of an irradiated part of each photoconductor is thus set to, for example, about −50 volts, so that electrostatic latent images corresponding to the image information are formed on the respective photosensitive drums 14K, 14C, 14M, and 14Y.

As for the electrostatic latent images corresponding to the image information on the respective colors and formed on the corresponding photoconductors, a DC bias of, for example, −300 to −500 volts, on which the AC bias is superimposed, is applied to each development sleeve at a development step executed by the developing units 13K, 13C, 13M and 13Y. As a result, toners (Q/M: −20 to −30 µC/g) are developed only at image parts having potentials reduced by LD writing, thereby forming toner images.

The toner images on the photoconductors for the respective colors thus formed are transferred onto the transfer paper transported by the registration roller 23 and attracted onto the transfer belt 18 by causing the transfer paper to pass through the nip constituted by the transfer belt 18 and the paper suction roller 41 by a bias (a transfer bias) having an opposite polarity to a charging polarity of the toners applied to the transfer brushes 21K, 21C, 21M, and 21Y arranged to be opposite to the respective photoconductors across the transfer belt 18. Reference symbol 40 denotes a sensor that detects a light quantity adjustment pattern to be explained later. Reference symbol 20 denotes a roller for ensuring a contact between the transfer belt 18 and each of the photosensitive drums 12K, 12C, 12M, and 12Y. Only rollers 20M and 20Y are shown in FIG. 1. It is noted that the specific potential values are only examples.

Figure 2:
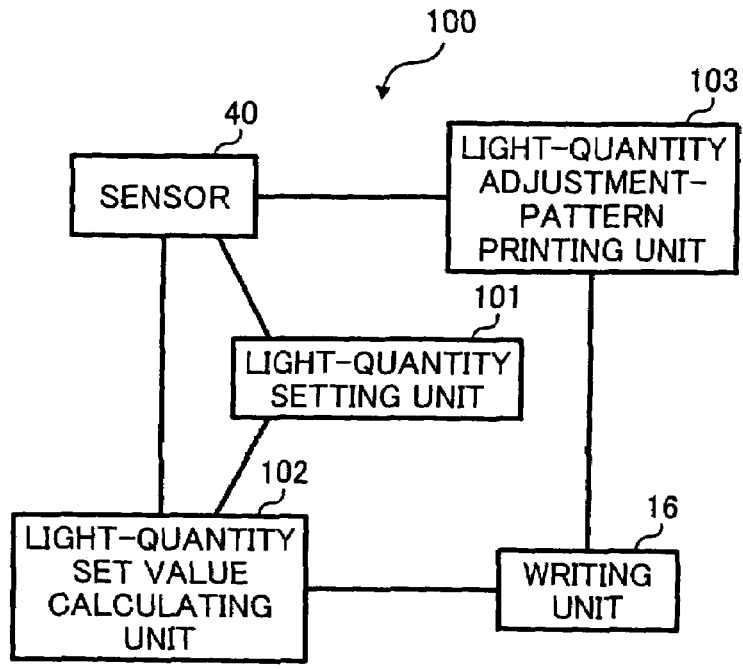
FIG. 2 is a block diagram of a control configuration for adjusting a light quantity.
Figure 3:
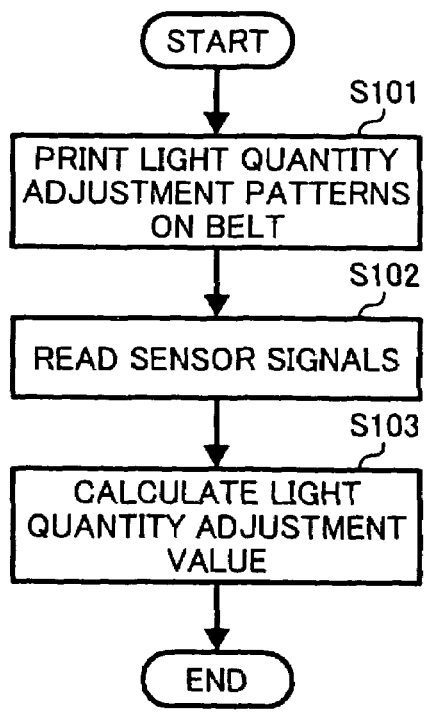
FIG. 3 is a flowchart of a light quantity adjustment procedure.

FIG. 2 is a block diagram of a control configuration for adjusting a light quantity. FIG. 3 is a flowchart of a light quantity adjustment procedure. A light-quantity adjustment controller 100 includes a light-quantity setting unit 101, a light-quantity set-value calculating unit 102, a light-quantity adjustment-pattern printing unit 103, a writing unit 16, and the sensor 40.

Figure 6:
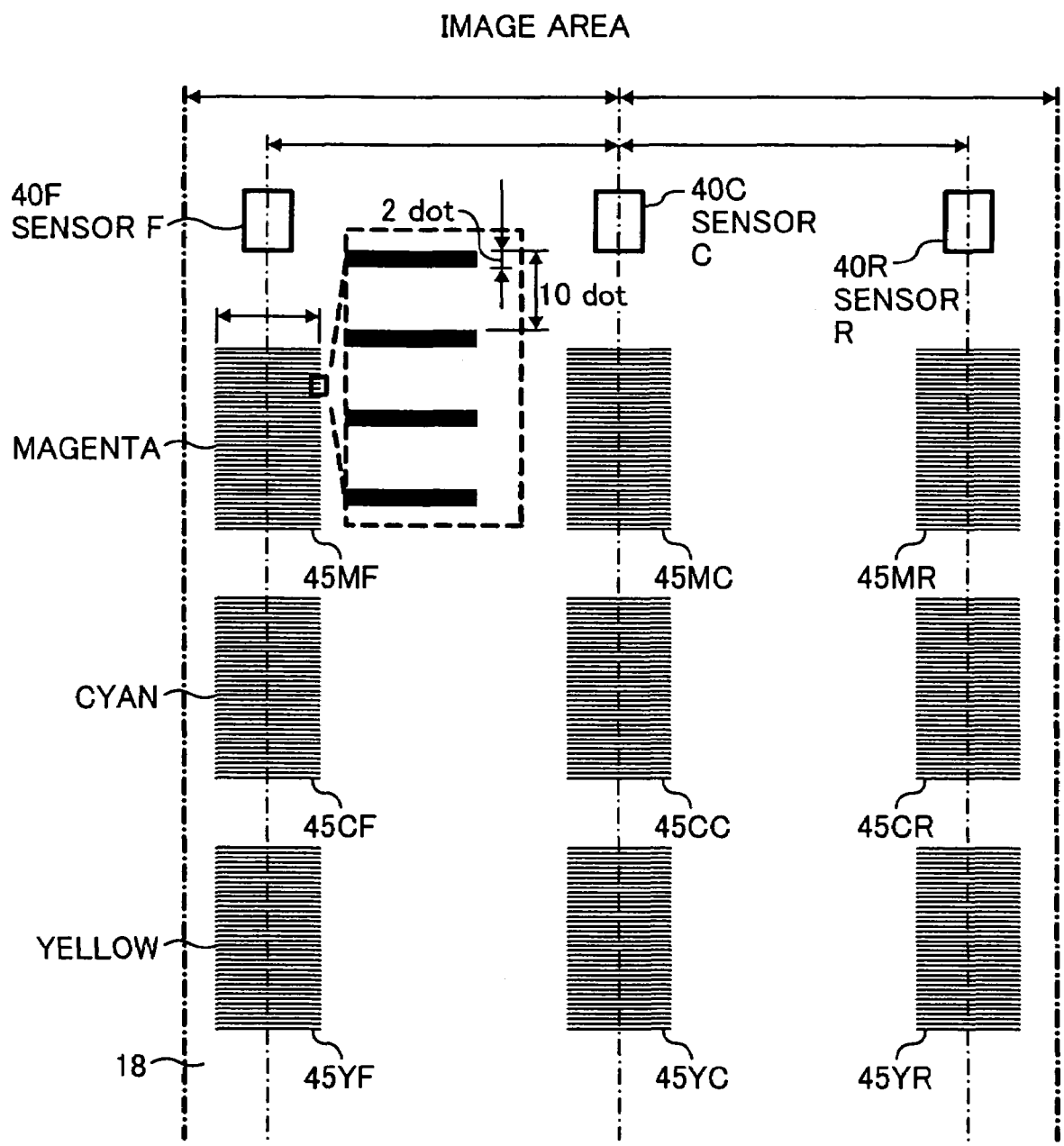
FIG. 6 depicts light quantity adjustment patterns formed on a transfer belt.

In the embodiment, a light quantity is adjusted as follows. As shown in the flowchart shown in FIG. 3, the light-quantity adjustment-pattern printing unit 103 instructs the writing unit 16 to print light quantity adjustment patterns, and the writing unit 16 prints the light quantity adjustment patterns on the transfer belt 18 as shown in FIG. 6 (step S101). Sensors 40F, 40C, and 40R that constitute the sensor 40 detect a quantity of a reflecting light from each pattern. The light-quantity set-value calculating unit 102 reads outputs of the sensors 40F, 40C, and 40R (step S102), and calculates a light quantity adjustment value (step S103). Based on the calculated light quantity adjustment value, the light-quantity setting unit 101 sets a light quantity during a print operation.

Figure 4:
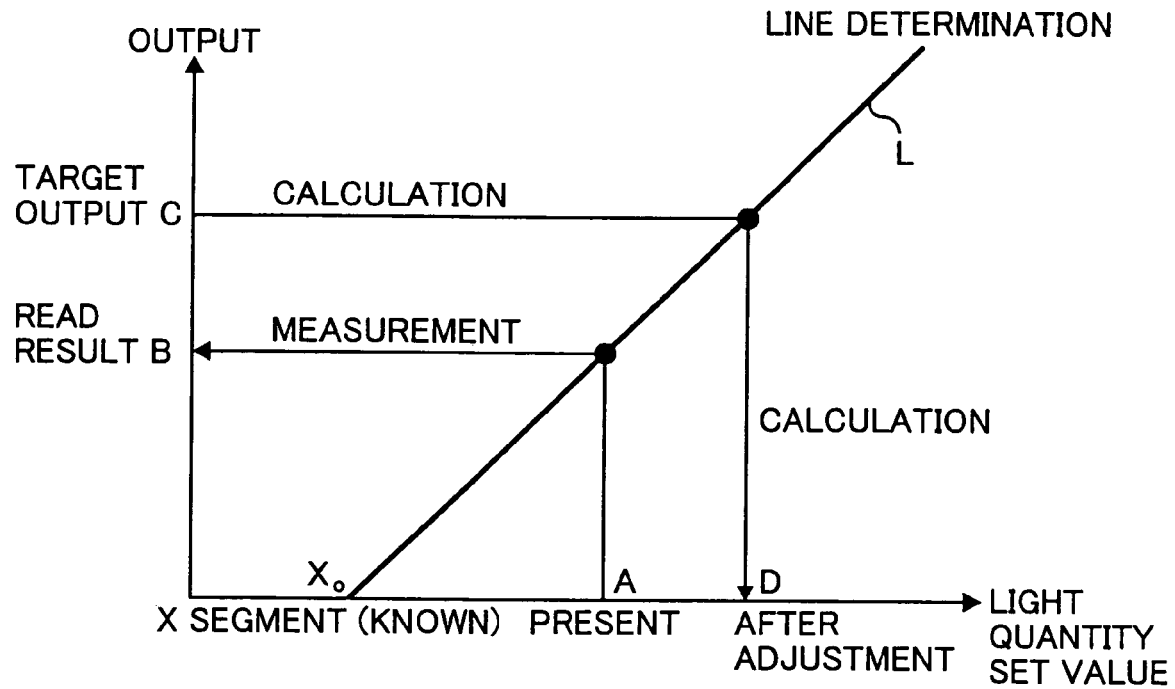
FIG. 4 depicts a relationship between a light quantity set value and a light quantity adjustment pattern output.
Figure 5:
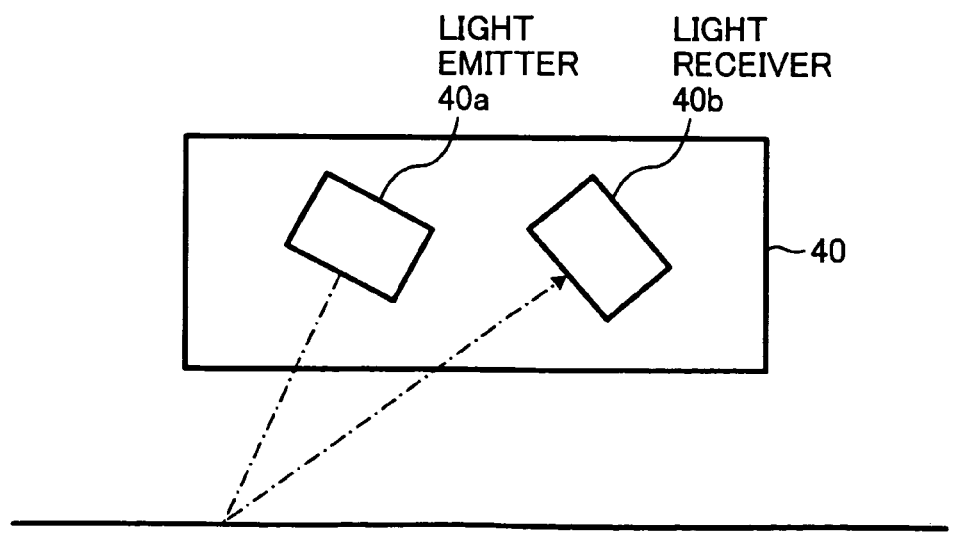
FIG. 5 is a conceptual diagram of a configuration of a sensor.

FIG. 4 depicts a relationship between a light quantity set value and a light quantity adjustment pattern output. FIG. 5 is a conceptual diagram of a configuration of the sensor 40. To adjust the light quantity, the light-quantity setting unit 101 calculates an X segment (a light quantity set value set to a light emitter 40a of the sensor 40 at a point of a line L at which an output of a detector is zero) from the line L that indicates the relationship between the light quantity set value and an output of the sensor 40 during reading of the light quantity adjustment patterns in advance. The X segment can be either common to apparatuses or specific to each apparatus. When color registration is actually executed, a current light quantity A is set to the light emitter 40a of the sensor 40, and a detected output B from a light receiver 40b of the sensor 40 for the quantity of reflecting light by each light quantity adjustment pattern (denoted later by reference symbol 45) is read. A light quantity set value at which this output B becomes a target output C is calculated from the line L that passes the X segment and a coordinate (X, Y)=((current light quantity set value), (read result)). Namely, a set value D after adjustment is expressed as follows.

(Set value after adjustment)=((set value before adjustment)−(X segment))×(target output)/(read result)+(X segment).

FIG. 6 depicts light quantity adjustment patterns formed on the transfer belt 18. The sensor 40 is constituted by the three sensors 40F, 40C, and 40R provided in a front portion, a central portion, and a rear portion, respectively. The sensors 40F, 40C, and 40R read light quantity adjustment patterns 45CF, 45MF, 45YF, 45CC, 45MC, 45YC, 45CR, 45MR, and 45YR (hereinafter, the light quantity adjustment patterns are represented by reference symbol 45) provided in an image formation region of the transfer belt 18 for the colors of C, M, and Y, respectively. The light quantity adjustment patterns 45 are set at ten-dot intervals each at a width of two dots in a sub scan direction and set larger than a spot diameter of the sensor 40 in a main scan direction. Although the number of patterns 45 in the sub scan direction is arbitrarily set, the number is set so that an external shape of each light quantity adjustment pattern 45 thus formed is larger than the spot diameter of the sensor 40 in the sub scan direction.

The light quantity is adjusted through the procedures of the flowchart shown in FIG. 3. To adjust the light quantity, a density of each light quantity adjustment pattern is adjusted in halftones as shown in FIG. 6. Therefore, the target output at the time of adjusting the light quantity can be set differently from target outputs of patterns 46, 47, and 48 for color registration deviation detection or trigger detection shown in FIG. 7. It is therefore possible to set a target output for reducing failures during the light quantity adjustment independently from target outputs for the later color registration deviation detection patterns 46 and 47 for making effective use of a dynamic range and for ensuring reliability of a trigger or the trigger detection pattern 48.

Figure 7:
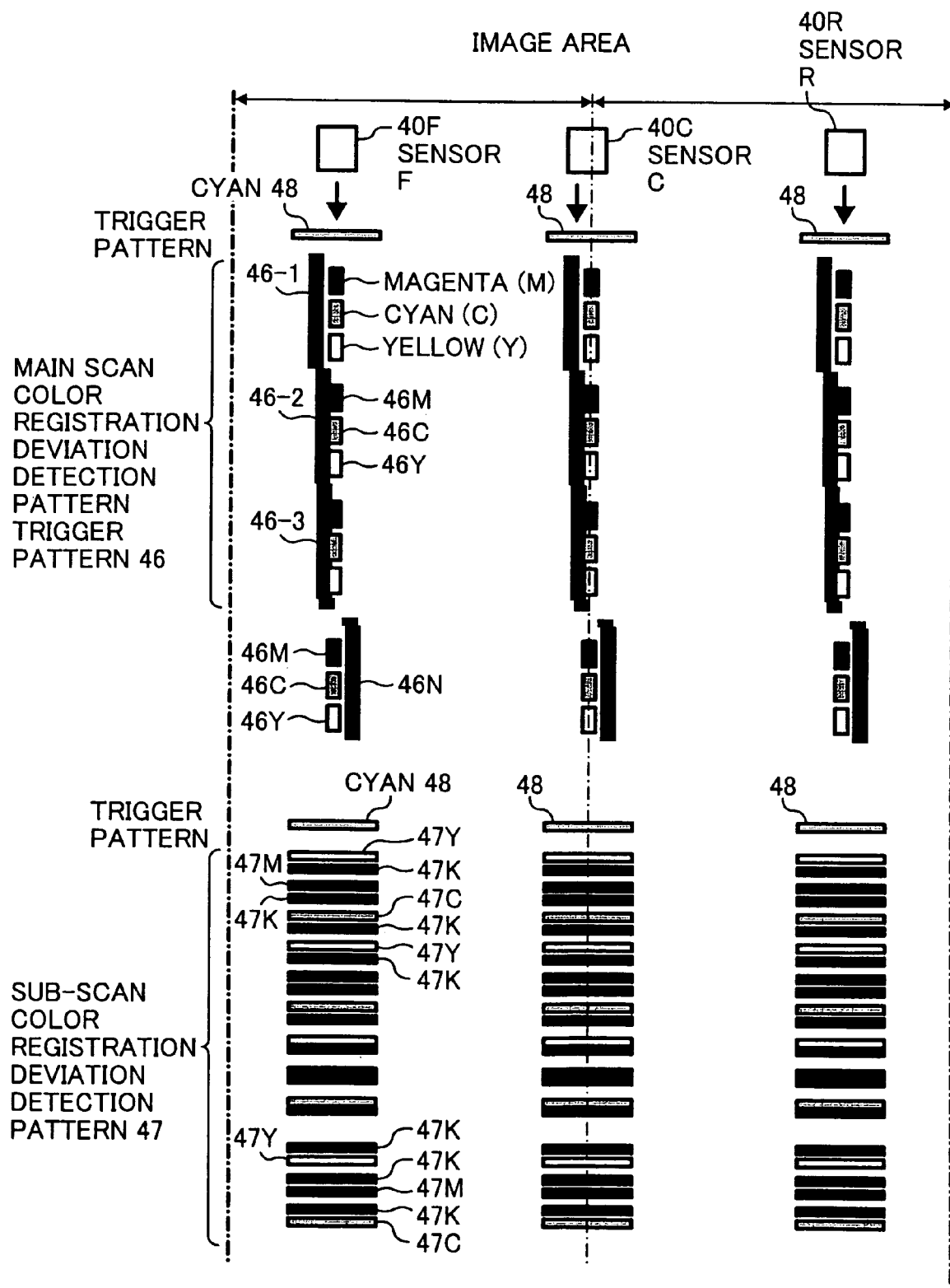
FIG. 7 is an example of print patterns for color registration deviation detection.

FIG. 7 is an example of print patterns for the color registration deviation detection. As shown in FIG. 7, the main scan color registration deviation detection pattern 46 is constituted by patterns 46M, 46C, and 46Y of the three colors of magenta (M), cyan (C), and yellow (Y) arranged in the sub-scan direction and a pattern 46K of black (K) formed along an arrangement direction of the patterns of the three colors. The patterns 46M, 46C, and 46Y of the three colors are formed on a line extending along the sub scan direction whereas the black pattern 46K is formed at a position shifted in the main scan direction by a predetermined width (predetermined number of dots). By so forming, a position at which the patterns 46M, 46C, and 46Y of the three colors of M, C, and Y are superimposed on the pattern 46K is detected as a position in the main scan direction without position deviation. In FIG. 7, the patterns 46K, 46M, 46C, and 46Y of the colors of black and three other colors sequentially deviated by as much as a deviation amount of a first pattern 46-1 and that of a second pattern 46-2 between a third pattern 46-3 and an N$^{th}$ pattern 46-N (Where N is an integer equal to or greater than 3) with respect to the sub scan direction are not shown. The patterns 48 for trigger detection using the color registration deviation detection patterns 46 are colored uniformly, for example, in cyan. Alternatively, the color used for the color registration deviation detection can be selected according to sensitivity of a color to the sensor 40. If the light quantity adjustment patterns 45 of this color are formed like the cyan patterns shown in FIG. 6 and the output of each of these light quantity adjustment patterns 45 is adjusted to the target value, the reliability of the trigger is ensured. If it suffices to adjust an output level of one color to the target value during the light quantity adjustment, it is unnecessary to provide the light quantity adjustment patterns of the other colors.

The sub scan color registration deviation detection pattern 47 is constituted by a plurality of patterns 47C, 47Y, and 47M of cyan (C), yellow (Y), and magenta (M) formed each by a predetermined width larger than a detection width of the sensor 40 in the main scan direction and formed at predetermined intervals in the sub scan direction, and a plurality of patterns 47K of black (K) formed at preset intervals slightly narrower than the intervals of the adjacent patterns 47C, 47Y, and 47M of the respective colors. In FIG. 7, the black patterns 47K are formed adjacent to the yellow pattern 47Y, the magenta pattern 47M, and the cyan pattern 47C in the sub scan direction, respectively. Thus, the black patterns 47K and the other patterns 47C, 47Y, and 47M are sequentially formed and the black patterns 47K are formed at narrower intervals than those of the other patterns 47C, 47Y, and 47M. Therefore, one of the black patterns 47K is superimposed on one of the other patterns 47C, 47Y, and 47M at an arbitrary position, and the position can be detected. The position is determined as the position at which no position deviation is generated in the sub scan direction. Based on the output of the light quantity detected at this time, the color registration deviation (position deviation) can be detected.

During the light quantity adjustment, the light quantity can be adjusted so that outputs of the patterns of three colors of magenta, cyan, and yellow are read once and so that a maximum output among the three colors is equal to the target value. By doing so, if the color registration deviation patterns shown in FIG. 7 are read later, it is ensured that the outputs of the color registration patterns do not exceed the respective target values of the color registration deviation patterns despite a difference among the three colors in density.

Figure 8:
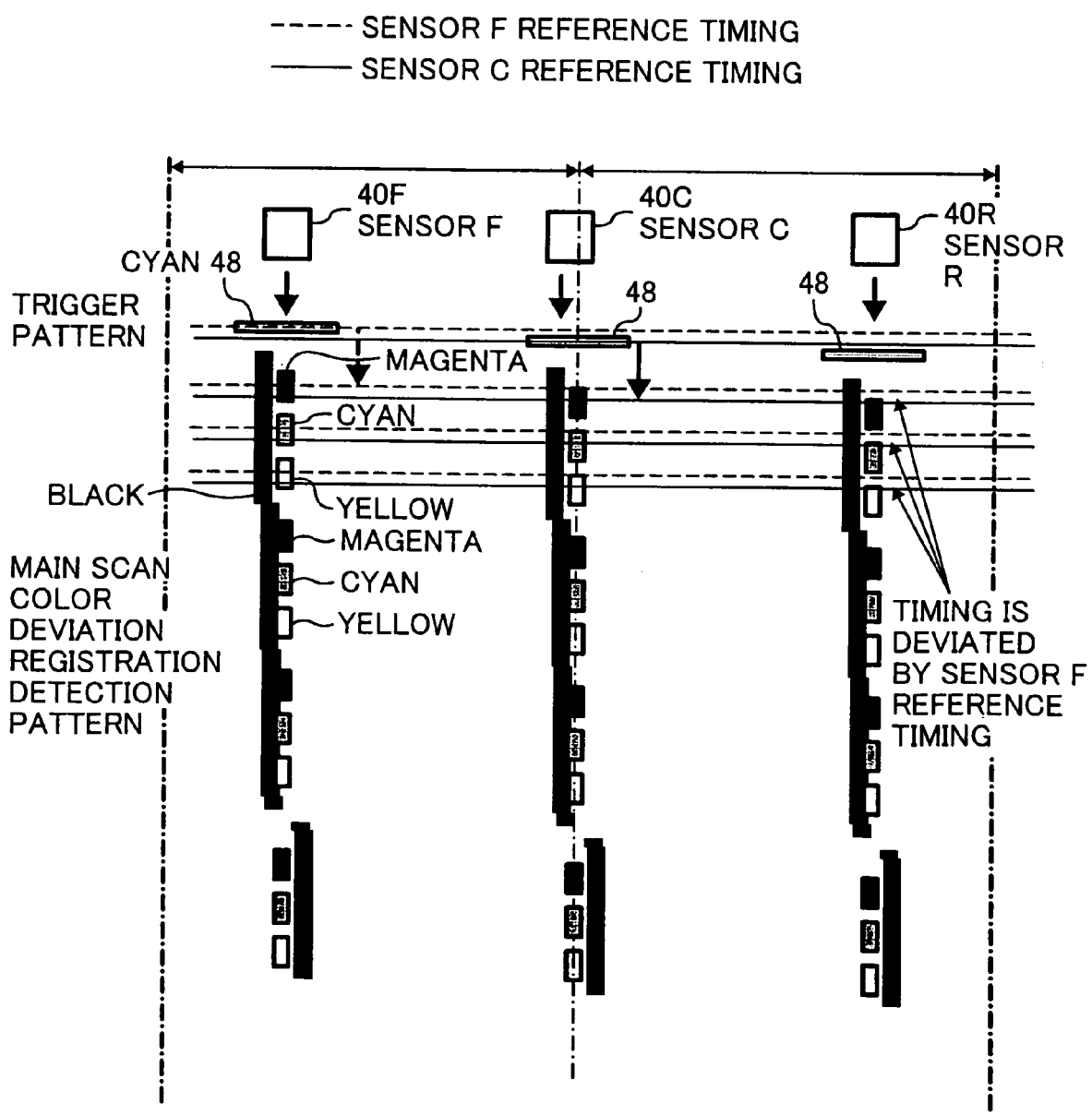
FIG. 8 is another example of the print patterns for color registration deviation detection.

As shown in FIG. 8, a plurality of columns of the position deviation detection patterns 46 and 47 (hereinafter, reference symbol 46 denotes the main scan color registration deviation detection pattern and reference symbol 47 denotes the sub scan color registration deviation detection pattern) formed in the sub scan direction are aligned in the main scan direction. When a plurality of the sensors 40F, 40C, and 40R detect the color registration deviation in the main scan direction, for example, if the trigger pattern 48 in a left end column is the reference for the read timing and outputs of patches are sequentially read and a skew occurs, then a timing of reading the patterns in a right end column is disadvantageously deviated from an original read timing as indicated by dot lines. (The skew means an image which is formed aslant as shown in FIG. 8, although it should be originally horizontal in the main scan direction if the main scan direction is positioned in a horizontal direction and the sub scan direction is positioned in a vertical direction.) When such a disadvantage occurs, if a trigger is started at the patterns in a central column, it is possible to reduce the read timing deviation caused by this skew as indicated by solid lines.

A plurality of columns of the position deviation detection patterns 47 shown in, for example, FIG. 7 and formed in the sub scan direction are aligned in the main scan direction and the sensors 40F, 40C, and 40R perform a main scan once to detect patterns. In this case, during the light quantity adjustment, the light quantity adjustment patterns 45 formed in columns corresponding to the sensors 40F, 40C, and 40R as shown in FIG. 5 are employed. To adjust the light quantity, different target values are set between the columns in which the trigger is detected and those in which the trigger is not detected. With this adjustment, it is possible to adjust necessary and optimum light quantity according to the individual columns. For example, the front sensor 40F and the rear sensor 40R can adjust the light quantity to a level 1.5 times as high as that to which the central sensor 40C adjusts the light quantity.

Figure 9:
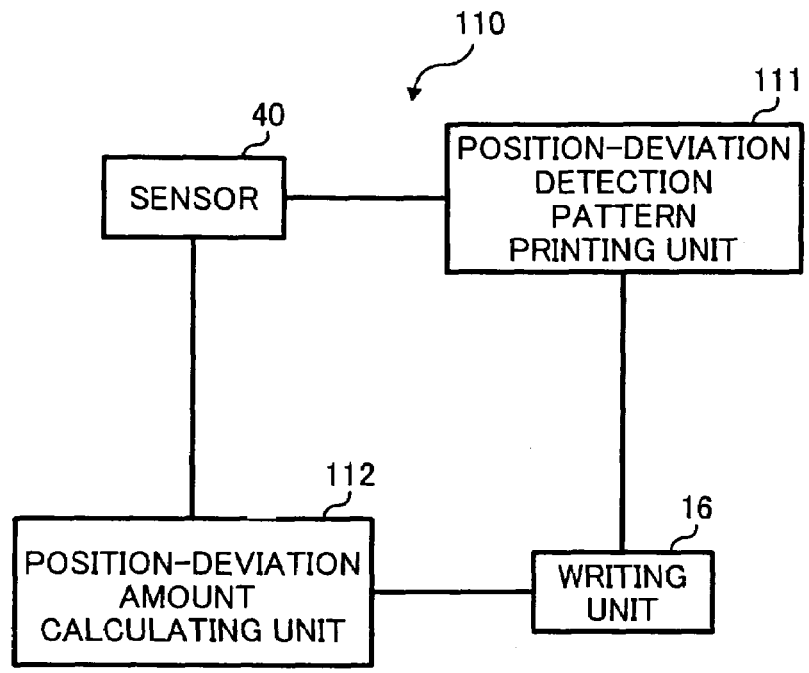
FIG. 9 is a block diagram of a configuration of a color registration deviation detector.
Figure 10:
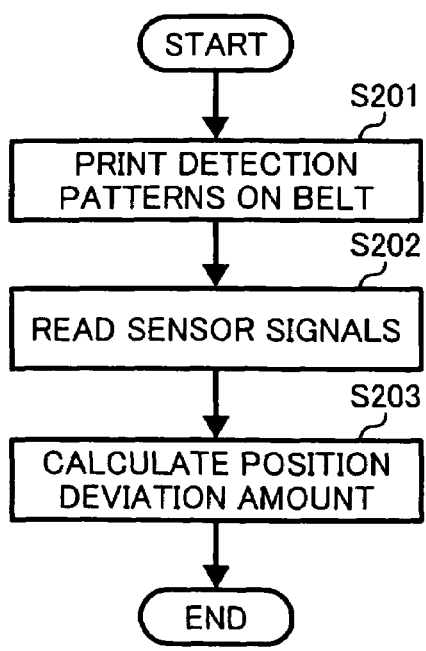
FIG. 10 is a flowchart of an color registration deviation detection procedure.

FIG. 9 is a block diagram of a configuration of a color registration deviation detector. A color registration deviation detector 110 includes the sensor 40, a position-deviation detection pattern printing unit 111, a position-deviation amount calculating unit 112, and the writing unit 16. In the color registration deviation detector 110 thus constituted, as shown in the flowchart shown in FIG. 10, the position-deviation detection pattern printing unit 111 prints the color registration deviation detection patterns shown in FIG. 7 on the transfer belt (step S201), and the sensor 40 reads reflecting lights from the detection patterns 46 and 47 (step S202). Based on the read output, the position-deviation amount calculating unit 112 calculates the position deviation amount (step S203).

Figure 11:
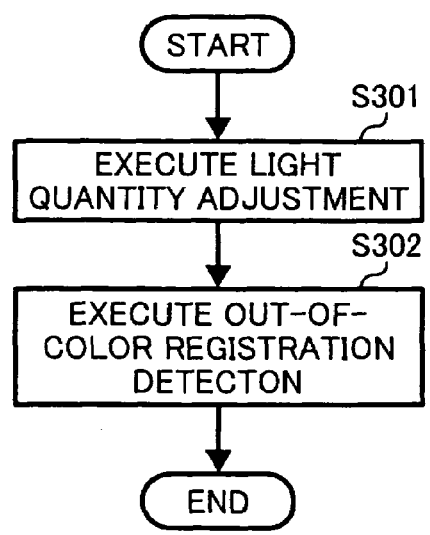
FIG. 11 is a flowchart depicting the order of the light quantity adjustment procedure and the color registration deviation detection procedure.

The position deviation amount detection is performed after the light quantity is adjusted as shown in the flowchart shown in FIG. 11 for the following reason. Unless the light quantity is adjusted, the position deviation amount cannot be calculated based on the detection obtained by detecting the position deviation detection patterns. The position deviation amount can be detected by detecting the reference value and also by using, for example, a maximum and a minimum detection values or based on a detection value change rate. Since the position deviation amount detection is a well-known technique, detailed explanation thereof is omitted.

According to the conventional technique for the light quantity adjustment, the processing of changing the set value of the light quantity and reading the outputs of the patterns is repeated a plurality of times so as to obtain the light quantity set value at which the desired target output can be obtained, which takes long time. According to the embodiment, by contrast, it suffices to perform the processing of forming the patterns and reading the outputs of the patterns only once. Therefore, the adjustment time can be reduced, thereby reducing user's waiting time.

The light quantity adjustment patterns are set to have a larger width than the spot diameter of the sensor to prevent the outputs from being changed due to a deviation of relative positions. It is, therefore, possible to improve reliability and accuracy of the light quantity adjustment relative to the position deviation.

By adjusting the density of each pattern in halftones, the target output for the light quantity adjustment can be set differently from that for the color registration deviation detection pattern or the trigger detection pattern. An output overrange can be reduced at the time of reading the light quantity adjustment patterns, instances at which calculation for adjustment cannot be performed can be reduced, and the reliability of the light quantity adjustment can be improved. In addition, by adjusting the density of each pattern in halftones, stable output is ensured and the accuracy of the light quantity adjustment can be improved. The dynamic range of the color registration deviation pattern or the trigger detection pattern is ensured, so that the accuracy and the reliability of the color registration deviation detection can be improved.

The trigger processing is performed once or a plurality of times during the color registration deviation detection. By forming trigger patches all in one color and adjusting an output level of this one color to the target value during the light quantity adjustment, the reliability of the trigger during the color registration deviation detection can be ensured.

The outputs of the light quantity adjustment patterns are read for the three colors of magenta, cyan, and yellow, and the output of the color having the highest output level is adjusted to the target value. By doing so, even if the three colors differ in density, the outputs of the patterns of all the three colors do not exceed their respective target values set in view of the dynamic ranges during the later color registration deviation detection. It is, therefore, possible to improve the accuracy and the reliability of the color registration deviation detection.

By starting the trigger at the patterns in the central column, the read timing deviation caused by the skew can be reduced and the reliability of the color registration deviation detection can be improved.

The target values are set differently between the columns in which the trigger is detected and those in which the trigger is not detected during the light quantity adjustment. By doing so, even if the light quantity adjustment target value optimum for the trigger detection differs from that optimum for the color registration deviation detection, necessary and optimum light quantity adjustment can be performed according to the individual columns. It is therefore possible to improve the accuracy and the reliability of the color registration deviation detection.

By adjusting the light quantity before the color registration deviation detection without fail, the reliability and the accuracy of the color registration deviation detection can be improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light quantity adjusting apparatus comprising:
a forming unit that forms a pattern on an image carrier;
a detector that detects a light quantity of a reflecting light from the pattern formed by the forming unit and outputs a voltage corresponding to the light quantity detected;
a calculating unit that reads the light quantity of the reflecting light from the pattern detected once by the detector based on a present light quantity set for the detector, and calculates from the light quantity read, a set light quantity corresponding to a target output voltage for printing; and
a setting unit that sets the set light quantity calculated by the calculating unit.

2. The light quantity adjusting apparatus according to claim 1, wherein
the forming unit forms the pattern as a light quantity adjustment pattern.

3. The light quantity adjusting apparatus according to claim 1, wherein the calculating unit
plots on an xy coordinate plane a light quantity detected by the detector along an x axis and a voltage output by the detector along a y axis,
sets in advance an x axis segment, at which the light quantity is equal to zero, for a line approximating a relationship between the light quantity and the voltage, and
calculates the set light quantity corresponding to the target output voltage using the line defined by the x axis segment set, the present light quantity, and the light quantity detected once.

4. The light quantity adjusting apparatus according to claim 1, wherein the calculating unit
plots on an xy coordinate plane a light quantity detected by the detector along an x axis and a voltage output by the detector along a y axis,
sets in advance an x axis segment X0, at which the light quantity is equal to zero, for a line approximating a relationship between the light quantity and the voltage, and
calculates the set light quantity D corresponding to the target output voltage C, using a coordinate (A, B) where the present light quantity is A and the light quantity detected once is B, from an equation that expresses the line:

$$y-C=\{B/(A-X0)\}(x-D).$$

5. The light quantity adjusting apparatus according to claim 1, wherein
the forming unit forms the pattern so that a width of the pattern in a main scan direction is larger than a spot diameter of the detector.

6. The light quantity adjusting apparatus according to claim 1, wherein
the forming unit forms the pattern so that the pattern is constituted by halftones.

7. The light quantity adjusting apparatus according to claim 1, wherein
the forming unit forms a color registration deviation detection pattern in which a trigger patch of a preset one color is drawn at a tip end in a sub scan direction, and
the setting unit sets an output level of the one color used in the trigger patch as a target value.

8. The color-registration-deviation amount detecting apparatus according to claim 7, wherein
the forming unit forms three or more color registration deviation detection patterns in a main scan direction, and
the detector uses a trigger patch formed in a center color registration deviation detection pattern among the three or more color registration deviation detection patterns as a trigger for detection.

9. The light quantity adjusting apparatus according to claim 1, wherein
the forming unit forms the pattern in three colors of magenta, cyan, and yellow, and
the setting unit sets an output of the color having a highest detection level among the three colors as a target value.

10. A color-registration-deviation amount detecting apparatus comprising:
a light quantity adjusting apparatus including
a forming unit that forms a pattern on an image carrier,
a detector that detects a light quantity of a reflecting light from the pattern formed by the forming unit and outputs a voltage corresponding to the light quantity detected,
a calculating unit that reads the light quantity of the reflecting light from the pattern detected once by the detector based on a present light quantity set for the detector, and calculates from the light quantity read, a set light quantity corresponding to a target output voltage employed for printing, and
a setting unit that sets the set light quantity calculated by the calculating; and
a color-registration-deviation amount detector that detects a color registration deviation amount after the setting unit sets the set light quantity.

11. The color-registration-deviation amount detecting apparatus according to claim 10, wherein
the forming unit forms a color registration deviation detection pattern, and
the color-registration-deviation amount detector detects the color registration deviation amount based on a light quantity used for detecting the color registration deviation detection pattern formed.

12. The color-registration-deviation amount detecting apparatus according to claim 11, wherein,
the forming unit forms the color registration deviation detection pattern so as to be constituted by three or more trigger patterns formed in a main scan direction, each of the trigger patterns having a size larger than a detection width of the detector,
patterns of three colors of magenta, cyan, and yellow are formed in columns in a sub scan direction relative to the trigger patterns respectively, and
black patterns are sequentially formed at shifted positions by predetermined amounts of variations relative to the respective patterns of the three colors in any one of the main scan direction and the sub scan direction.

13. The color-registration-deviation amount detecting apparatus according to claim 10, wherein
the forming unit forms three or more color registration deviation detection patterns in a main scan direction, and
the detector uses a trigger patch formed in a center color registration deviation detection pattern among the three or more color registration deviation detection patterns as a trigger for detection.

14. The color-registration-deviation amount detecting apparatus according to claim 10, wherein a target value of a light quantity set for a column of patterns not used as a trigger for detection is different from a target value of a light quantity set for a column of patterns used as a trigger for detection.

15. A method of adjusting light quantity in an image forming apparatus including an image carrier, the method comprising:
forming a pattern on the image carrier;
detecting a light quantity of a reflecting light from the pattern formed at the forming and outputting a voltage corresponding to the light quantity detected;
reading the light quantity of the reflecting light from the pattern detected once at the detecting based on a present light quantity set for the detecting;
calculating from the light quantity read, a set light quantity corresponding to a target output voltage for printing; and
setting the set light quantity calculated by the calculating.

16. The method according to claim 15, wherein
the forming includes forming the pattern as a light quantity adjustment pattern.

17. The method according to claim 15, wherein the calculating includes
plotting on an xy coordinate plane a light quantity detected at the detecting along an x axis and a voltage output along a y axis,
setting in advance an x axis segment, at which the light quantity is equal to zero, for a line approximating a relationship between the light quantity and the voltage, and
calculating the set light quantity corresponding to the target output voltage using the line defined by the x axis segment set, the present light quantity, and the light quantity detected once.

18. The method according to claim 15, wherein the calculating includes
plotting on an xy coordinate plane a light quantity detected at the detecting along an x axis and a voltage output along a y axis,
setting in advance an x axis segment X0, at which the light quantity is equal to zero, for a line approximating a relationship between the light quantity and the voltage, and
calculating the set light quantity D corresponding to the target output voltage C, using a coordinate (A, B) where the present light quantity is A and the light quantity detected once is B, from an equation that expresses the line:

$y - C = \{B/(A-X0)\}(x-D)$.

19. The method according to claim 15, wherein
the forming includes forming the pattern so that a width of the pattern in a main scan direction is larger than a spot diameter of the detecting.

20. The method according to claim 15, wherein
the forming includes forming the pattern so that the pattern is constituted by halftones.

21. The method according to claim 15, wherein
the forming includes forming a color registration deviation detection pattern in which a trigger patch of a preset one color is drawn at a tip end in a sub scan direction, and
the setting includes setting an output level of the one color used in the trigger patch as a target value.

22. The method according to claim 15, wherein
the forming includes forming the pattern in three colors of magenta, cyan, and yellow, and
the setting includes setting an output of the color having a highest detection level among the three colors as a target value.

23. A method of determining a color registration deviation amount in an image forming apparatus including an image carrier, the method comprising:
forming a pattern on the image carrier;
detecting a light quantity of a reflecting light from the pattern formed at the forming and outputting a voltage corresponding to the light quantity detected;
reading the light quantity of the reflecting light from the pattern detected once at the detecting based on a present light quantity set for the detecting;
calculating from the light quantity read, a set light quantity corresponding to a target output voltage for printing;
setting the set light quantity calculated by the calculating; and
determining a color registration deviation amount after the set light quantity is set at the setting.

24. The method according to claim 23, wherein
the forming includes forming a color registration deviation detection pattern, and
the determining includes determining the color registration deviation amount based on a light quantity used for determining the color registration deviation detection pattern formed.

25. The method according to claim 24, wherein,
the forming includes forming the color registration deviation detection pattern so as to be constituted by three or more trigger patterns formed in a main scan direction, each of the trigger patterns having a size larger than a detection width of the detecting,
patterns of three colors of magenta, cyan, and yellow are formed in columns in a sub scan direction relative to the trigger patterns respectively, and
black patterns are formed adjacent to the respective patterns of the three colors at predetermined intervals.

26. The method according to claim 23, wherein
the detecting is performed at three or more positions in a main scan direction, and
the detecting includes detecting a trigger on the patterns in a central column when detecting the color registration deviation detection pattern.

27. The method according to claim 23, wherein the setting includes setting a light quantity for a column of patterns in which a trigger is not detected to any one of a target value that is same as and different from a target value for a column of patterns in which a trigger is detected.

28. A light quantity adjusting apparatus comprising:
a forming means for forming a pattern on an image carrier;
a detecting means for detecting a light quantity of a reflecting light from the pattern formed by the forming means and outputting a voltage corresponding to the light quantity detected;
a calculating means for reading the light quantity of the reflecting light from the pattern detected once by the detecting means based on a present light quantity set for the detecting means, and calculating from the light quantity read, a set light quantity corresponding to a target output voltage for printing; and
a setting means for setting the set light quantity calculated by the calculating means.

* * * * *